No. 892,181.  
PATENTED JUNE 30, 1908.

S. PETERSON.

CHRISTMAS TREE HOLDER.

APPLICATION FILED OCT. 21, 1907.

WITNESSES:  
D. E. Carlsen  
M. M. Carlsen

INVENTOR:  
Sigfried Peterson  
BY HIS ATTORNEY:  
A. M. Carlsen

UNITED STATES PATENT OFFICE.

SIGFRIED PETERSON, OF ST. PAUL, MINNESOTA.

CHRISTMAS-TREE HOLDER.

No. 892,181.  Specification of Letters Patent.  Patented June 30, 1908.

Application filed October 21, 1907. Serial No. 398,359.

*To all whom it may concern:*

Be it known that I, SIGFRIED PETERSON, a subject of the King of Sweden, having declared my intention of becoming a citizen of the United States, residing at St. Paul, in the county of Ramsey and State of Minnesota, have invented a new and useful Christmas-Tree Holder, of which the following is a specification.

My invention relates to improvements in devices for holding Christmas trees, and the object is to provide an improved, simple but efficient Christmas tree holder which may easily be adjusted to any size of trees.

Figure 1:
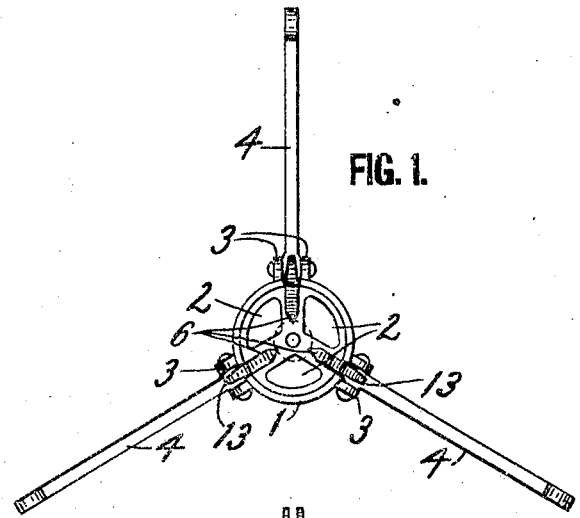
Figure 2:
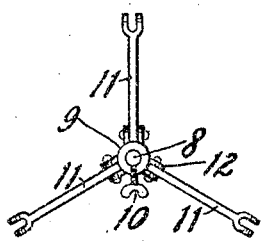
Figure 3:
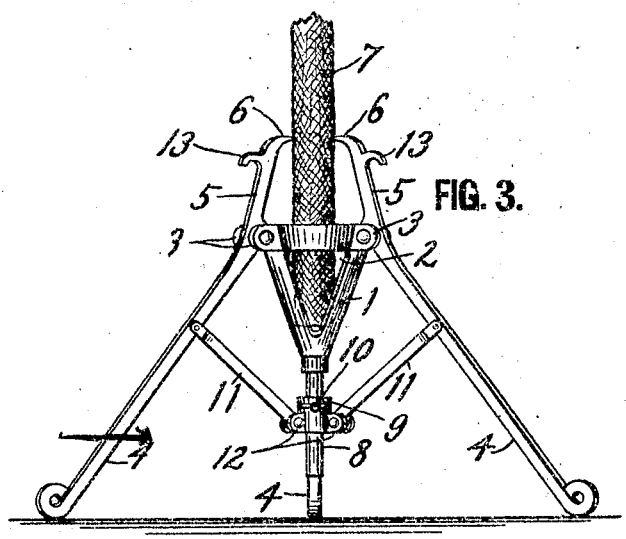

In the accompanying drawing Figure 1 is a top view of the foot or stand I provide for holding the tree. Fig. 2 is a bottom view of the lower middle portion of Fig. 3. Fig. 3 is a side elevation of my device with a stem or trunk of a tree held by it.

Referring to the drawing by reference numerals, 1 designates a funnel shaped receptacle for the lower end of the tree stem. It may be made of sheet iron with solid sides, or, as in Figs. 1 and 2 cast with side openings 2 so as to save metal. The upper edge of the funnel is provided with ears 3, between which are pivoted three legs 4 adapted to stand on the floor in a partly spread position, while their upper ends project above the ears and form arms having each a spur 6 adapted to be pressed into the side of the stem of the tree 7, whose lower end is thus firmly held down as far as it can go into the funnel, according to its thickness, and the spurs also give lateral support to the tree. To hold the spurs engaged with the tree against accidental pushing or pulling sidewise on the tree, or lifting of it, and in order to make the stand easy to fold, I provide the lower end of the funnel with a fixed pendant 8, on which slides a collar 9 having a thumb screw 10 by which it may be held tightly at any point of the pendant. Said collar or runner is connected with the legs 4 by braces 11 having each one end pivoted to one of the legs and the other end pivoted to lugs 12 of the collar.

In applying the device to the trunk of the tree, the latter is placed in the funnel and the legs are spread and used as levers to force the spurs 6 into the wood, whereupon the screw 10 is tightened. To remove the tree the screw 10 is unscrewed and the tree lifted out, the spurs disengaging by themselves from the weight of the legs 4. The legs are thereafter folded to the pendant 8 and the device is put away till it is wanted again.

As a modification useful for small and cheap tree holders, the arms 5 are provided with external hooks or guards 13 below which a cord or ribbon (not shown) may be tied about the arms and thus hold the spurs 6 engaged. In such a modified grade of the device the pendant 8, collar 9 and braces 11 may be dispensed with, and whether they be dispensed with or not the guards 13 may be there as ornaments and for stepping on in forcing home the spurs, and for supporting presents on and about the tree.

Having thus described my invention, what I claim is:—

In a device of the kind described, the combination with a funnel-shaped receptacle having a pendant extending from its lower end, legs pivoted to the upper edge of the funnel and having above the funnel arms with inward projecting spurs, a slidable collar on the pendant, a set-screw in the collar for holding it adjustably on the pendant, and braces pivoted with their outer ends to the legs and their inner ends to the collar.

In testimony whereof I affix my signature, in presence of two witnesses.

SIGFRIED PETERSON.

Witnesses:
A. M. CARLSEN,
D. E. CARLSEN.